United States Patent [19]
Viaud et al.

[11] Patent Number: 4,798,044
[45] Date of Patent: Jan. 17, 1989

[54] MACHINE FOR FORMING CYLINDRICAL BALES OF CROP

[75] Inventors: Jean Viaud, Sarraguemines; Daniel Gunther, Morsbach, both of France

[73] Assignee: Deere & Company, Moline, Ill.

[21] Appl. No.: 89,282

[22] Filed: Aug. 25, 1987

[30] Foreign Application Priority Data

Aug. 28, 1986 [GB] United Kingdom ............... 8620799

[51] Int. Cl.⁴ ..................... A01F 15/00; B30B 5/06
[52] U.S. Cl. ............................... 56/341; 56/344; 100/88
[58] Field of Search ............... 56/341, 344; 100/88

[56] References Cited

U.S. PATENT DOCUMENTS

| | | |
|---|---|---|
| 3,974,632 | 8/1976 | Van der Lely ............... 100/88 |
| 4,206,587 | 6/1980 | Freimuth ..................... 56/341 |
| 4,399,746 | 8/1983 | Viaud . | 
| 4,406,221 | 9/1983 | Parrish ....................... 56/341 |
| 4,458,587 | 7/1984 | Jennings ..................... 56/341 |
| 4,470,247 | 9/1984 | Mast . |
| 4,566,380 | 1/1986 | Clostermeyer ............... 56/341 |

FOREIGN PATENT DOCUMENTS

| | | |
|---|---|---|
| 110056 | 6/1984 | European Pat. Off. ............. 56/341 |
| 217715 | 4/1987 | European Pat. Off. ............. 56/341 |
| 3247661 | 6/1984 | Fed. Rep. of Germany ........ 56/341 |
| 830151 | 3/1960 | United Kingdom ................ 56/341 |
| 2146288 | 4/1985 | United Kingdom . |
| 2152873 | 8/1985 | United Kingdom . |

*Primary Examiner*—Douglas Hart

[57] ABSTRACT

A baling machine for forming large cylindrical bales of hay has a gate which can be raised to enable a completed bale to pass under it for discharge. The bale initially rests on a horizontal support which is connected by a cable and link to the gate. On the gate being raised sufficiently to enable the bale to pass freely below it, the moving gate pulls the support via the cable and link downwardly to form a discharge ramp along which the bale rolls onto the ground. The support is contained entirely within the confines of the machine, and thus, does not extend behind it.

9 Claims, 4 Drawing Sheets ns on a predetermined opening of the gate sufficient for the bale to pass through the opening.

The gate can be connected to the support for this purpose by a simple mechanical arrangement, but an electronic or other arrangement can be used.

Thus, without adding to the overall length of the machine it is possible to alleviate the problem of the completed bale fouling the gate.

Embodiments of a machine according to the present invention will now be described with reference to the accompanying drawings.

DESCRIPTION OF THE PREFERRED EMBODIMENT

Figure 1:
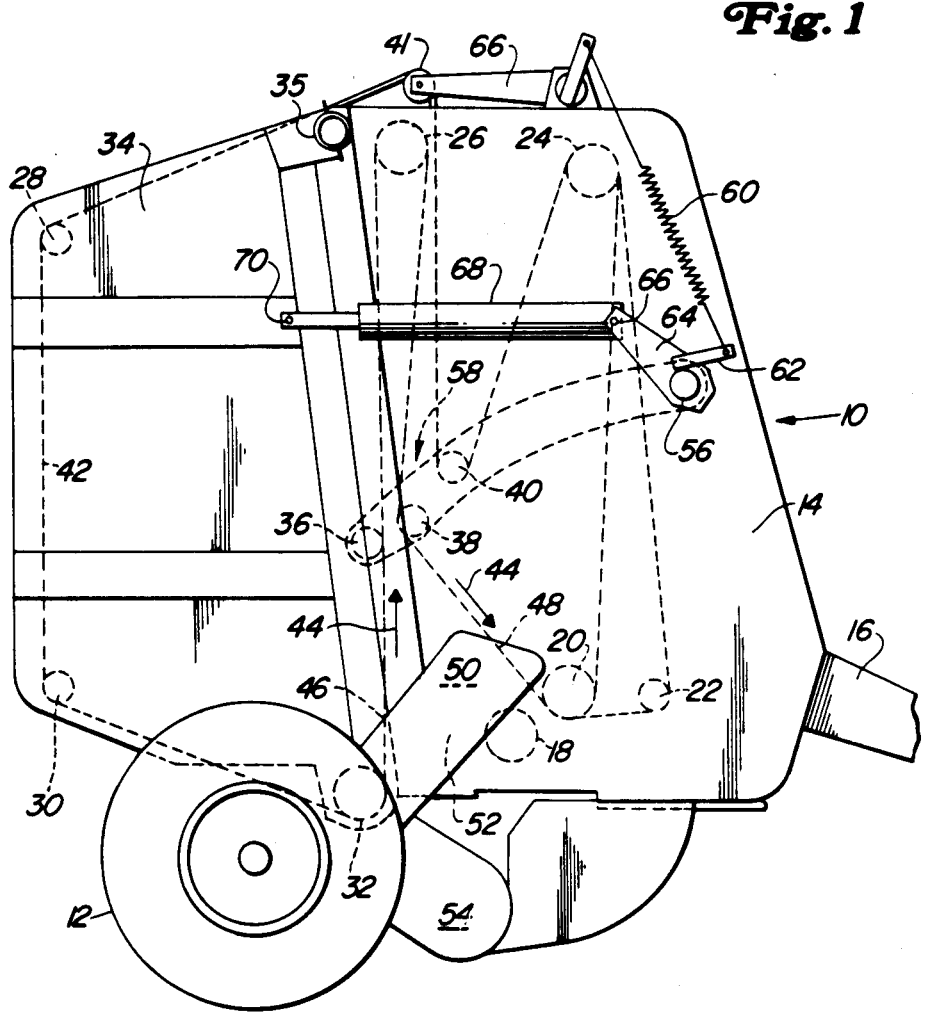
FIG. 1 is a view from the right of the side of a conventional round baler for forming large cylindrical bales of hay shown in broken lines some details within the machine.

In the drawings, the baler includes a main frame 10 mounted on a pair of wheels 12. The main frame has an upright fore-and-aft extending wall 14 on either side connected by transverse beams (not shown). A draft tongue 16 is connected to a transverse beam at the front of the frame 10 and extends forwardly for attaching the baler to a tractor (also not shown) which draws the machine.

A plurality of lateral rolls extends over the width of the machine (FIG. 1). One set of rolls 18, 20, 22, 24, 26 is journalled in the sidewalls 14, while another set consisting of rolls 28, 30, 32 is journalled in a gate 34 which is swingable about a pivot axis 35 at the top of the baler. There is also a pair of chamber restricting rolls 36, 38 and two belt take-up rolls 40, 41.

Six rubber belts 42 are trained side-by-side over the rolls, with the exception of the roll 18 which acts as a stripper roll, to provide the configuration shown and they move in the direction indicated by arrows 44, the stripper roll 18 being driven anticlockwise as viewed in FIG. 1. However, alternate belts only are trained over the lower foremost roll 22, while the remaining belts by-pass this roll, to provide a staggered array which is of no significance in relation to the present invention but which is described in U.S. Pat. No. 4,399,746 granted 23 Aug. 983. Upwardly extending runs 46, 48 of the belts 42 define a bale-forming chamber 50 the ends of which are provided by the sidewalls 14 and gate 34 and which has an inlet 52 for crop received from a pick-up 54 beneath it.

In order to accommodate the increasing diameter of a growing bale core in the bale-forming chamber 50, the size of the chamber must also increase and a belt take-up and tensioning mechanism is provided at either side of the machine. These mechanisms include a pair of rearwardly extending idler arms which are mounted rigidly at the forward end of the main frame 10 on a horizontal transverse shaft 56, providing a pivot connection for the arms, and of which the right-hand arm 58 only is shown; the belt take-up roll 40 which is supported at either end at an intermediate location on the arms 58; and the pair

MACHINE FOR FORMING CYLINDRICAL BALES OF CROP

BACKGROUND OF THE INVENTION

The present invention relates to a baling machine for cylindrical bales of crop.

Machines, towed by a tractor, for forming large cylindrical bales of hay (so called "round balers") are well-known. As the machines advances, the crop is removed from a windrow by a pickup mechanism and delivered rearwardly to a baling chamber where it is rolled into a bale.

There are basically two forms of such machines, namely those with a fixed volume baling chamber defined by driven fixed-position rolls and those with a baling chamber defined by runs of driven belts which move outwardly to enlarge the chamber to accommodate the bale as it grows in size. In both forms the hay is caused by the driven movement of the rolls or belts to roll around upon itself into a core and the core rotates about its horizontal axis and finally a completed bale is formed, the chamber being fed throughout with hay. The completed bale is tied with twine to maintain its shape and is discharged by rolling through a gate formed by a rear portion of the machine.

The gate is swingable about a horizontal pivot axis located at the top of the baler so that the gate moves rearwardly and upwardly from a closed position in which it is approximately vertical to a fully open position at an angle of about sixty degrees to the vertical at which the completed bale can pass freely under it.

At discharge, however, a bale can foul the gate if the latter is not sufficiently open before ejection starts. The rolling movement of the bale from the machine is then slowed and although the bale may nevertheless be discharged once the gate gains its fully open position, the bale tends not to roll away from the gate on reaching the ground. In these circumstances when the gate closes it will foul the bale lying below it, and so the baler has to be maneuvered to clear this obstruction before the gate can be shut with consequent loss of time in the harvesting operation.

In GB-A-No. 2 138 354 it has been proposed to provide a horizontal grid supporting the bale which is triggered to move to a downwardly inclined position immediately once opening of the gate has started. After discharge, an automatic signal indicates to the driver whether the bale is clear of the gate swing area. The grid extends far beyond the rear of the machine when the gate is closed so that the bale would probably be deposited sufficiently clear of the gate generally to enable closure without fouling. However, this adds significantly to the overall length of the machine, and a fully formed bale can still foul the gate during its opening phase.

SUMMARY OF THE INVENTION

According to the present invention a baling machine for forming cylindrical bales of crop has a gate which can be raised to open it to allow a completed bale to be discharged through the opening and a support for the completed bale which is swingable between a non-discharge position and a discharge position to form a ramp down which the bale can roll to the ground, the support being swingable to the discharge position in dependence of chamber restricting rolls 36, 38 supported at the free ends of the arms. The arms are biased in an anticlockwise direction (in FIG. 1) by a pair of springs, one on either side of the main frame 10, of which only the right-hand spring 60 is shown and only its arrangement will be described, the other being similar. The spring 60 is connected at its lower end by a post 62 to a lever portion 64 of the arm 58, the portion 64 being rigid with the pivot shaft 56, and at its upper end to one arm of a bell crank 66 the other arm of which bears one end of the take-up roll 41. The free end of the lever portion 64 is pivotally connected at a point 66 to the cylinder of a piston and cylinder unit 68, loading the arm 58, of which the piston is in turn pivotally connected at the gate 34 at a point 70, a similar arrangement being provided also on the left-hand side of the machine.

As described thus far the baler is conventional. In the embodiment shown in FIG. 2, a support arrangement 72 is provided for a completed bale (not shown). This includes a normally horizontal support 74 below the rearward portion of the bale-forming chamber 50 when at its maximum size for a completed bale and located just above wheel 12 axle level. The support 74 has two longitudinal side beams 76, only the left-hand one being shown, and extends rearwardly but does not protrude beyond the back of the gate 34 so the support 74 is contained well within the confines of the rest of the machine. The support 74 is pivoted at a position towards its forward end about a horizontal shaft 78. Its forward end itself abuts, when in the horizontal position, a stop bar 80 below it.

The following details apply to both sides of the machine, although for clarity only one side will be considered. An overcenter linkage 82 is connected between the forward end of the support 74 and an upright post 84 extending above the support and serving as an anchor member. The linkage 82 is loaded toward the horizontal position of the support 74 by a spring 86 connected between the upper part of the linkage 82 and the mid portion of the side beam 76, and is "breakable" via a cable 88 running from its overcenter pivot 89 at the center of the linkage to an upper beam 90 of the gate 34. The cable 88 passes over lower and upper pulleys 92, 94 and is connectable selectively to any of four points 96, 98, 100, 102 on the beam 90 which correspond to different desired openings of the gate 34 for correspondingly different bale diameters. In order to compensate for different cable lengths obtained by using these various connection points a spring 104 is included in the cable run. When the gate 34 is swung by the piston and cylinder unit 68 from its closed position in FIG. 2 it will reach a preselected opening corresponding to the particular connection point 96, 98, 100, 102 chosen for attachment of the cable 88 at which the cable will break the overcenter linkage 82 against the loading of the spring 86 so that the linkage assumes the position shown in broken lines in FIG. 2 whereby the support 74 is swung downwardly about the shaft 78 to form a discharge ramp for the completed bale. On restoring the gate 34 to the closed position, the spring 86 will return the support 74 to its horizontal position.

Figure 2:
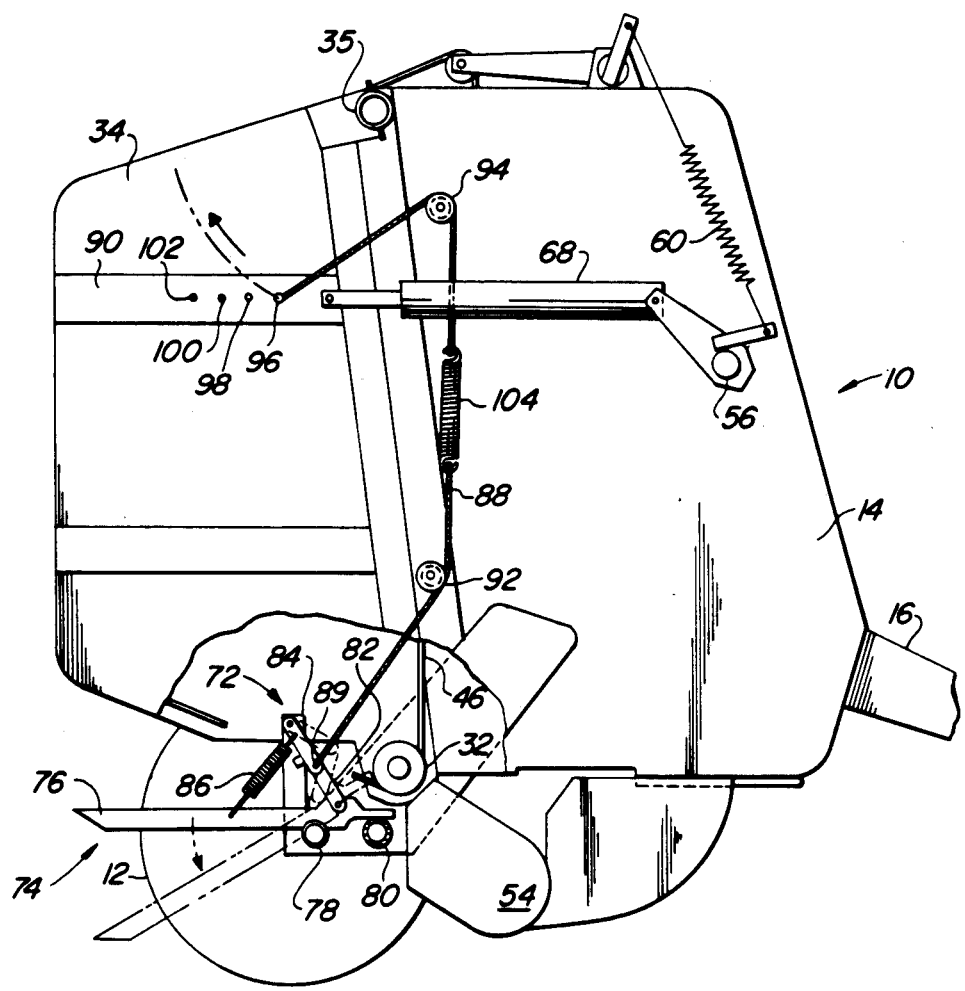
FIG. 2 shows the machine of FIG. 1, also from the right, but with a discharge support arrangement for the completed bale.
Figure 3:
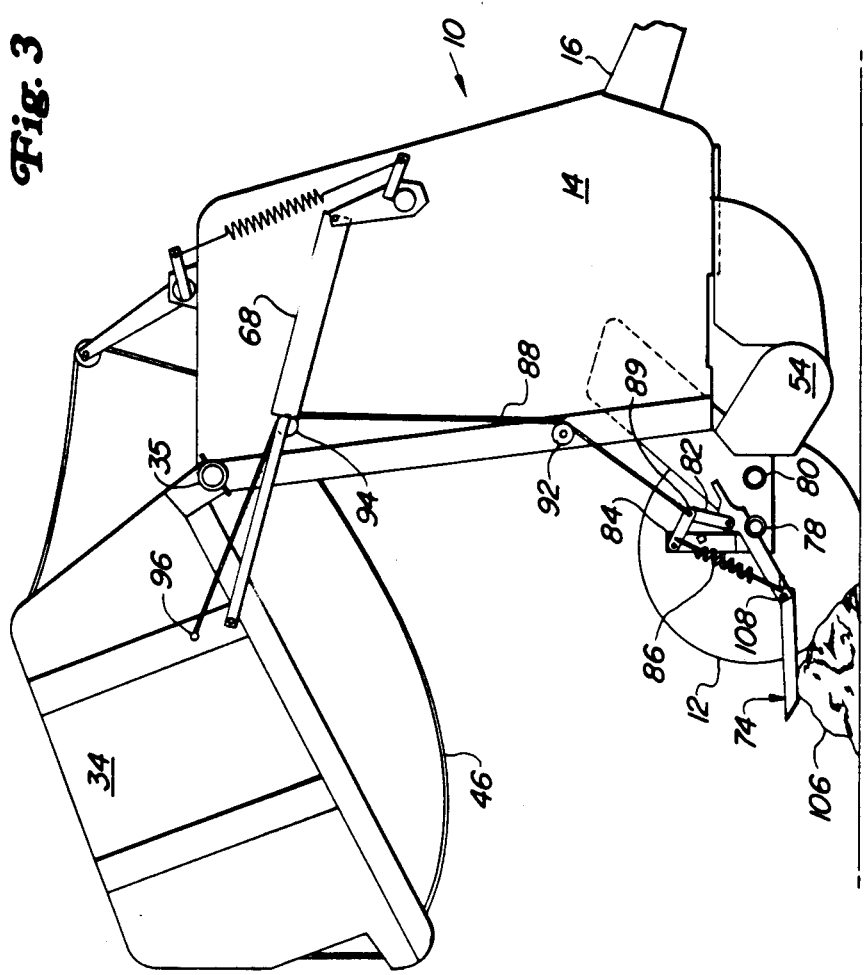
FIG. 3 shows the machine as in FIG. 2, but with a modified discharge support arrangement.

The embodiment of FIG. 3 is in principle generally similar to that of FIG. 2 except that there is only one upper connection point 96 for the cable 88 and therefore no spring 104. Consequently provision must be made in some other way for the possibility of the support 74 yielding if an obstruction 106 is encountered beneath it. This is achieved by allowing the support 74 to "break" about a pivot 108 disposed at its mid portion. In FIG. 3 the support 74 is shown in full lines in its discharge ramp position, but with its rearward portion having been swung upwardly by the obstruction 106.

Figure 4:
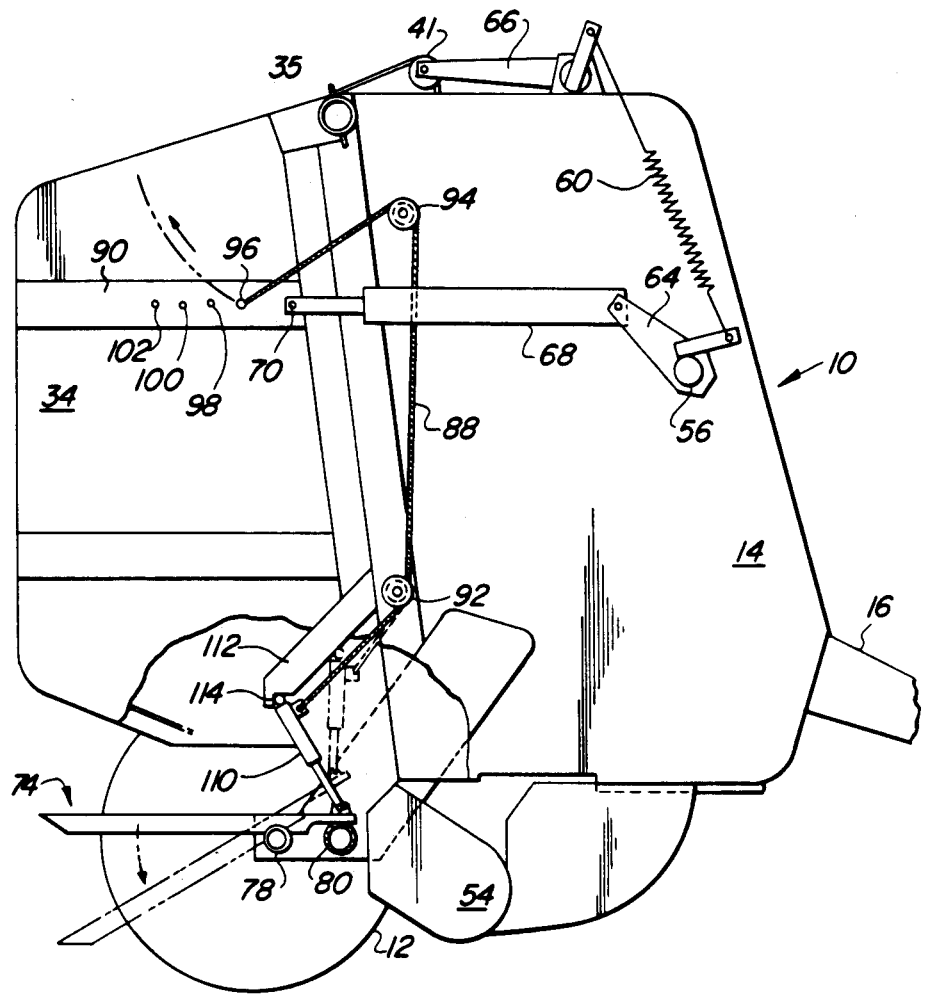
FIG. 4 shows the machine as in FIG. 2, but with a different discharge support arrangement.

The further embodiment shown in FIG. 4 has again four upper connection points 96, 98, 100, 102 for the cable 88, but both the compensation for the corresponding different cable lengths and the link moving the support 74 is afforded by a gas spring piston and cylinder unit 110 running at its upper end in a guide 112 (serving as an anchor member) and being pivotally connected at its lower end to the forward end of the support 74. The guide 112 has a recess 114 at its lower end in which the upper end of the unit 110 locks the support 74 in its horizontal nondischarge disposition. The full lines show the normal position of the support arrangement and the broken lines indicate the position which the arrangement adopts at discharge. Thus, the gate 34 opens and pulls the cable 88 at the predetermined opening, so drawing the upper end of the unit 110 upwardly along the guide 112 and hence swinging the support 74 to its downwardly inclined ramp position against the loading of a spring (not shown) corresponding to the spring 86 in FIGS. 2 and 3. When the gate 34 closes the spring serves to restore the support 74 to its horizontal position. The piston and cylinder unit 110 also has a useful role in protecting the support 74 from damage which might otherwise be caused if a very heavy bale were to fall on it in that the unit 110 will retract when a sufficient force is applied.

What is claimed is:

1. In a baling machine for forming cylindrical bales of crop including a bale chamber defined in part by a bale discharge gate pivotable about an upper front location thereof between a lowered closed position wherein it closes the chamber and a raised open position wherein it allows a completed bale to exit the chamber, a support extending beneath the bale discharge gate and being vertically pivotally mounted for movement between an elevated non-discharge position and a lowered discharge position wherein it forms a ramp for the bale to roll down, the improvement comprising: suspension means coupled between the support and the discharge gate and responsive to the discharge gate opening, only after the gate has opened a predetermined amount sufficient for permitting a bale to exit the chamber without fouling the gate, for lowering the support to its discharge position.

2. The baling machine defined in claim 1 wherein the suspension means includes a cable and a link with the cable having its opposite ends respectively coupled to the gate and the link and with the link being vertically pivotally mounted to an anchor member adjacent the support and being coupled to the support so that the latter can swing to the discharge position in response to the gate pulling the cable and the link.

3. The baling machine defined in claim 2 wherein the link is an overcenter linkage having its opposite ends respectively coupled to the support and anchor member and having an overcenter pivot attached to the cable so that in its locked overcenter position it maintains the support in its nondischarge position and on the gate pulling the cable the overcenter position is broken to swing the support to its discharge position.

4. A baling machine as defined in claim 2 wherein the anchor member defines a guide having a recess and the link is a gas spring piston and cylinder unit having one end coupled to the support and another end located for slidable movement along the guide between a locked position wherein the another end is located in said recess and an unlocked position removed from the recess; and the cable being coupled to the unit so as to remove it from the recess in response to the gate opening said predetermined amount.

5. A baling machine as defined in claim 2 wherein said gate includes a plurality of connection points selectable for connection to said cable and corresponding to different predetermined openings of said gate.

6. The baling machine as defined in claim 5 wherein the cable has a tensioning spring connected therein.

7. The baling machine defined in claim 1 wherein the support is spring-loaded toward the non-discharge position.

8. The baling machine defined in claim 1 wherein the support includes a pivot joint means permitting a rearward portion to pivot upwardly upon its underside striking an obstruction.

9. The baling machine defined in claim 1 wherein said support is dimensioned so as not to exceed the rearward extent of the remainder of the machine when the discharge gate is in its toward closed position.

* * * * *

UNITED STATES PATENT AND TRADEMARK OFFICE
CERTIFICATE OF CORRECTION

PATENT NO. : 4,798,044

DATED : 17 January 1989

INVENTOR(S) : Jean Viaud et al

It is certified that error appears in the above-identified patent and that said Letters Patent is hereby corrected as shown below:

Claim 9, line 4, change "toward" to -- lowered --.

Signed and Sealed this

Seventh Day of November, 1989

Attest:

JEFFREY M. SAMUELS

*Attesting Officer*   *Acting Commissioner of Patents and Trademarks*